March 8, 1949.  J. F. H. DOUGLAS ET AL  2,464,122
CONTROL OF ALTERNATING CURRENT MOTORS
Filed May 17, 1944    3 Sheets-Sheet 1
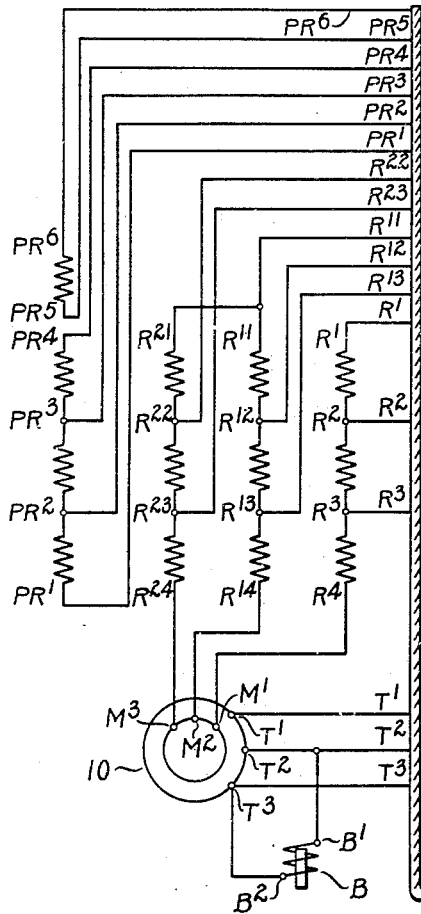
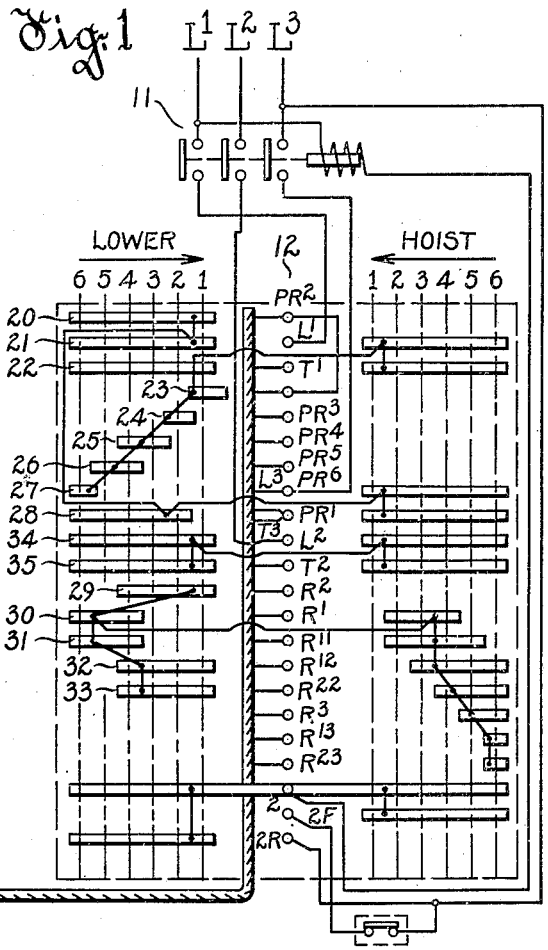
Fig. 1
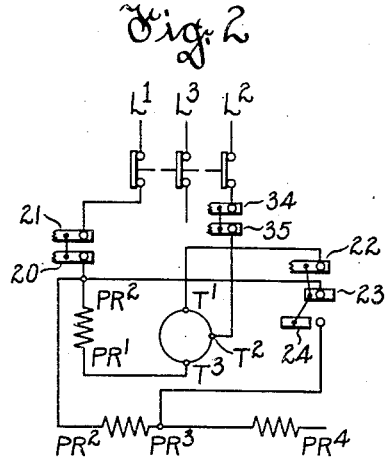
Fig. 2
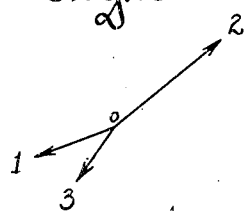
Fig. 2a
Inventors
John F. H. Douglas
Eric Pell
Edwin W. Seeger
By
Attorney March 8, 1949.　　　J. F. H. DOUGLAS ET AL　　　2,464,122
CONTROL OF ALTERNATING CURRENT MOTORS
Filed May 17, 1944　　　3 Sheets-Sheet 2
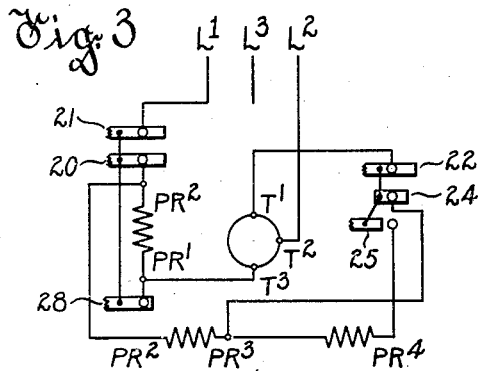
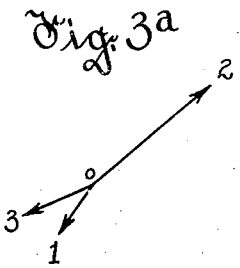
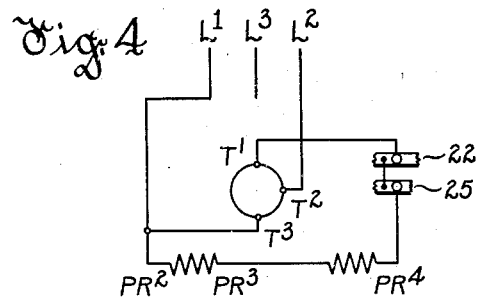
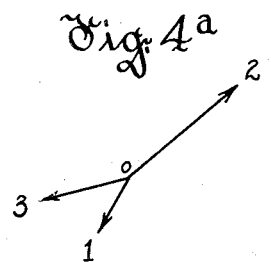
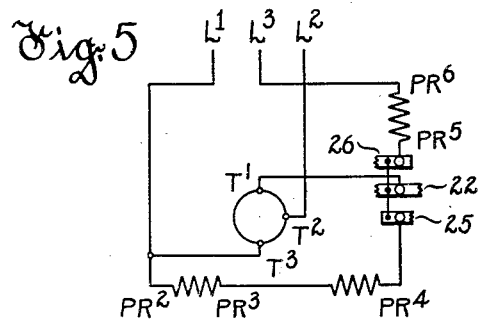
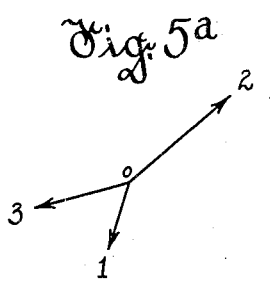
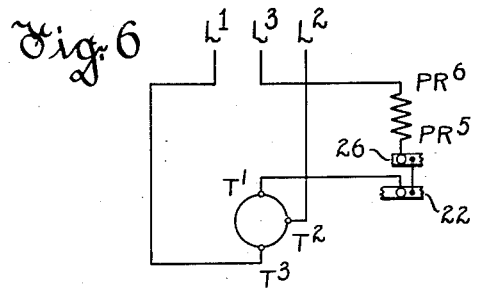
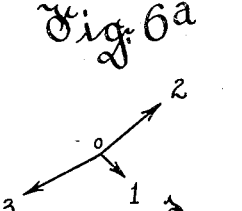
Inventors
John F. H. Douglas
Eric Pell
Edwin W. Seeger
By
Attorney March 8, 1949.  J. F. H. DOUGLAS ET AL  2,464,122
CONTROL OF ALTERNATING CURRENT MOTORS
Filed May 17, 1944  3 Sheets-Sheet 3

Patented Mar. 8, 1949

2,464,122

UNITED STATES PATENT OFFICE 2,464,122

CONTROL OF ALTERNATING CURRENT MOTORS

John F. H. Douglas, Milwaukee, Eric Pell, Shorewood, and Edwin W. Seeger, Wauwatosa, Wis., assignors to Cutler-Hammer, Inc., Milwaukee, Wis., a corporation of Delaware Application May 17, 1944, Serial No. 535,950

13 Claims. (Cl. 318—203)

This invention relates to improvements in control of alternating current motors, and while not limited thereto it is particularly advantageous in control of such motors where employed for hoisting and lowering widely varying loads.

In the application of R. P. Anderson, Serial No. 482,275, filed April 8, 1943, now Patent No. 2,436,413, patented February 24, 1948, and assigned to the assignee of the instant application, there is disclosed a highly satisfactory control for motors employed in the aforementioned service. Such control through use of an adjustable auto-transformer for unbalancing the motor primary affords lowering control having speed torque characteristics closely simulating those of direct current motor control. However, such control is of the full electromagnetic type and conversion thereof to the often desired drum type or other mechanical type of control presents difficulties including that of adequately protecting the transformer in shifting from tap to tap thereof. Even the electromagnetic control requires special design for such protection of the auto-transformer.

The present invention has among its objects to provide a comparable system of control obviating need of employment of an auto-transformer or any substitute means requiring protective provisions comparable to those required by the auto-transformer.

Another object is to provide a system having the advantages just mentioned and enabling control through the medium of either electromagnetic switches or mechanical switches, as for example a drum type controller.

Another object is to provide a system of the aforementioned character which like the aforementioned auto-transformer system will afford a first lowering step characterized by a small hoisting torque at zero speed and a second lowering step characterized by a small lowering torque at zero speed.

Another object is to provide for attainment of the desired lowering control through use of impedance alone and in such manner as to insure against loss of torque in changing from one lowering speed to another.

Various other objects and advantages of the invention will hereinafter appear.

The accompanying drawings illustrate an embodiment of the invention which will now be described, it being understood that the embodiment illustrated is susceptible of various modifications without departing from the scope of the appended claims.

In the drawings,

Figure 1 is a diagrammatic showing of a motor and a complete controller therefor of the drum type;

Figs. 2 to 7 are simplified diagrams of the motor primary connections established by the controller of Fig. 1 for lowering;

Figure 8:
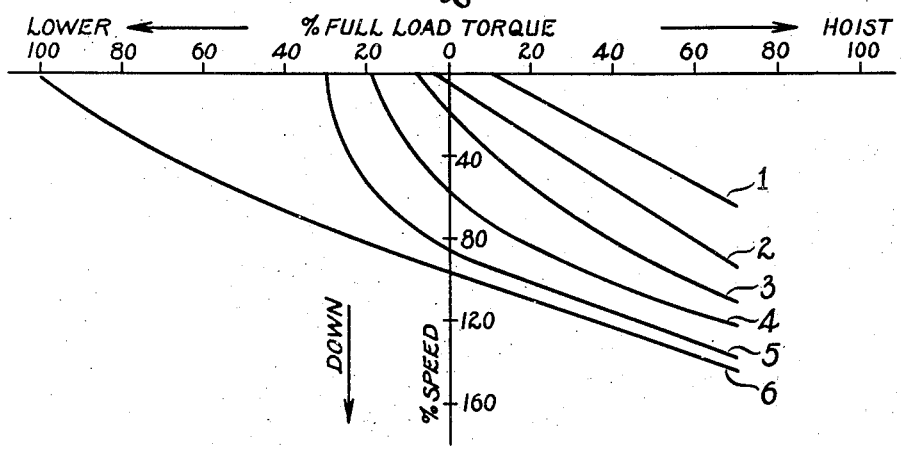

Figs. 2$^a$ to 7$^a$ are vector showings for certain of the circuit commutations illustrated in Figs. 2 to 5, respectively, and Fig. 8 depicts the speed torque characteristics which are approximated by the control herein disclosed.

Referring to Fig. 1, the same illustrates a slip ring motor 10 having a stator to be supplied from lines $L^1$, $L^2$ and $L^3$, the stator having terminals $T^1$, $T^2$ and $T^3$. The rotor of the motor has terminals $M^1$, $M^2$ and $M^3$ and said rotor has for control thereof in a conventional manner series impedances for each phase, shown as resistors $R^1$ to $R^4$, $R^{11}$ to $R^{14}$ and $R^{21}$ to $R^{24}$. Also as is customary the motor has associated therewith a shunt winding B for a brake not illustrated, said winding having a terminal $B^1$ thereof connected to the motor terminal $T^2$ and having a terminal $B^2$ connected to the motor terminal $T^3$.

The connections between the stator of motor 10 and the supply lines include a triple pole switch 11 preferably of the electromagnetic type to be controlled in any preferred manner and a drum type controller 12. All poles of the switch 11 are connected to the drum controller 12, the latter controlling all connections between the motor and the supply lines through said switch.

The drum controller 12 is in general of conventional form comprising two sets of contact segments marked "Hoist" and "Lower" and an intermediate set of contact fingers. The controller is shown in off position, from which it is movable in one direction to engage with certain of the fingers the hoisting segments or alternatively in a reverse direction to engage with certain of said fingers the lowering segments. The hoisting segments effect heretofore well known control, and accordingly the hoisting portion of the control will not be described in detail. The lower portion of the drum inclusive of certain of the hoisting segments and also certain of the lowering segments affords control of the electromagnetic line or main switch 11 in a well known way and accordingly detailed description of this portion of the control is needless, especially as the switch 11 might be otherwise controlled by or separately from the drum. For simplicity of illustration the circuit connections are in Fig. 1 shown in cable form instead of being shown in full but the reference characters used in connection with the drum, the motor and the resistors will enable the connections to be readily understood, whereas the circuit connections for lowering will be later described in detail in connection with Figs. 2 to 7.

The lowering segments of the drum comprise interconnected segments 20 and 21 to engage their respective contact fingers in all lowering positions of the drum. They also comprise interconnected segments 22, 23, 24, 25, 26 and 27, the segment 22 engaging its respective finger in all lowering positions of the drum. Segment 23 engages its respective finger in the first lowering position of the drum slightly in advance of engagement of the segments 20, 21 and 22 with their respective fingers. On the other hand, segment 23 disengages its contact finger prior to movement of the drum into position 2, this disengagement being preceded by engagement of segments 24 and 28 with their respective fingers. During movement of the drum from the second position to the third position the segment 24 disengages its respective finger while segment 25 engages its respective finger, remaining in engagement therewith when the drum is moved to its fourth lowering position. In the fourth lowering position segment 26 engages its respective finger and remains in engagement therewith when the drum is moved to its fifth lowering position. As the drum is moved to its fifth lowering position segment 25 is disengaged from its respective finger. When the drum is moved to its sixth lowering position segment 27 is engaged with its respective finger, segment 26 being disengaged from its respective finger. Also the drum has additional lowering segments inclusive of interconnected segments 29, 30, 31, 32 and 33. These segments are for control of the rotor circuit of the motor, the segments 29, 32 and 33 engaging their respective contact fingers in the first four lowering positions of the drum while segments 30 and 31 engage their respective fingers in lowering positions 4, 5 and 6. The additional lowering segments also includes segments 34 and 35 which in all lowering positions engage their respective contact fingers. These segments and contact fingers are merely provided for controlling the connection between line $L^2$ and motor terminal $T^2$.

When the drum is in its first lowering position the rotor circuit of the motor has included in each phase two of the three sections of resistance, the third section of each being short-circuited by engagement of the segments 29, 32 and 33 with their respective contact fingers.

The impedance used for control of the motor primary in lowering is shown as comprising resistors $PR^1$—$PR^2$, $PR^2$—$PR^3$, $PR^3$—$PR^4$ and $PR^5$—$PR^6$.

The connections established for the stator of the motor when the drum is in its first lowering position will be explained by reference to the simplified diagram Fig. 2, it being assumed that the switch 11 has been energized by the drum or by any other suitable control means. As previously explained and as shown in Fig. 2, the drum in its first lowering position engages segments 20, 21, 22, 23, 34 and 35, with their respective contacts, this effecting connection of both motor terminals $T^1$ and $T^3$ to line $L^1$ and connection of motor terminal $T^2$ to line $L^2$. The connection between terminal $T^1$ and line $L^1$, as will appear from Fig. 1, is a direct connection, whereas the connection between terminal $T^3$ and line $L^1$ includes resistance $PR^1$—$PR^2$. As will be understood, inclusion of resistance in series with the motor terminal $T^3$ causes phase 3 to be displaced from phase 1, the angle of displacement being substantially that depicted in the vector diagram Fig. 2$^a$. It is to be understood that the vector diagrams are for zero speed and that neither the vectors nor the speed torque curves purport to be exact. The speed torque characteristic thus obtained is substantially that depicted by curve 1 of Fig. 8 which shows at zero speed a small hoisting torque which however is rendered ineffective to cause hoisting, it being absorbed in the driving gearing. Thus by the connections described, the control in the first lowering position closely simulates that obtained with a system including an auto-transformer. It is true that resistance alone fails to afford as high a torque at a given speed as does the auto-transformer, but in many instances the difference is not of great importance.

As previously explained, the drum in moving from its first lowering position toward its second lowering position engages segment 24 with its contact finger after which the segment 23 disengages its respective finger, with the results which will be apparent from Fig. 2. More specifically, engagement of segment 24 with its contact finger completes circuit from motor terminal $T^1$ to line $L^1$, inclusive, of resistances $PR^2$—$PR^3$, this connection becoming effective as soon as segment 23 disengages its contact finger. The connections then obtaining with resistances between both of the motor terminals $T^1$ and $T^3$ with line $L^1$ are merely transition connections which it is to be noted provide for uninterrupted motor torque as the drum is moved from position 1 to position 2.

As the drum continues to move into its second position segment 28 engages its respective finger as aforedescribed, thus commutating the connections as depicted in Fig. 3. Here it will be noted that segment 28 by engaging its respective contact finger short-circuits the resistor $PR^1$—$PR^2$ between line $L^1$ and motor terminal $T^3$, whereas the resistor $PR^2$—$PR^3$ remains in circuit between motor terminal $T^1$ and line $L^1$. As a result of this circuit change the phase relation of phases 1 and 3 is changed to give the lead to phase 1, as indicated by the vector showing of Fig. 3$^a$. Thus the circuit commutation described as accomplished by movement of the drum to the second lowering position results in a change in speed torque characteristic to approximate that depicted by curve 2 of Fig. 8, and hence to approximate the speed torque characteristic where the aforementioned adjustable auto-transformer is employed.

As the drum moves to its third lowering position it engages segment 25 with its contact finger to establish the connections shown in Fig. 4 which become effective as segment 24 disengages its finger in moving the drum to the third lowering position. These conections are like those of Fig. 3 except for inclusion of the resistor $PR^3$—$PR^4$ in series with resistor $PR^2$—$PR^3$ between motor terminal $T^1$ and line $L^1$. This increase in resistance results in a vector change approximating that depicted by Fig. 4$^a$ and a change in speed torque characteristic to approximate that depicted by curve 3 of Fig. 8.

The drum when moved to its fourth lowering position maintains the connnections of Fig. 4 and by engagement of segment 26 with its respective finger connects motor terminal $T^1$ to line $L^3$ through resistor $PR^5$—$PR^6$ as shown in Fig. 5. This connection brings about the vector change depicted by Fig. 5$^a$ and a change in the speed torque curve to that depicted by curve 4 of Fig. 8.

The drum when moved to its fifth position disengages segment 25, Fig. 5, from its contact finger thus interrupting the connection from motor terminal $T^1$ to line $L^1$ through resistors $PR^2$—$PR^3$ and $PR^3$—$PR^4$, the primary connections then being as shown in Fig. 6. The vector showing then becomes that of Fig. 6a while the speed torque characteristic then follows curve 5 of Fig. 8, the motor rotor connections now being such as to provide for inclusion of all secondary resistance.

Figure 7:
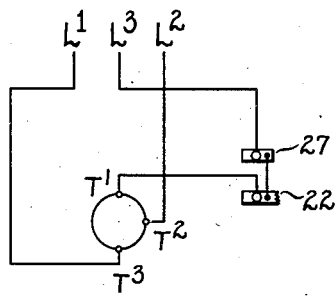
Figure 7A:
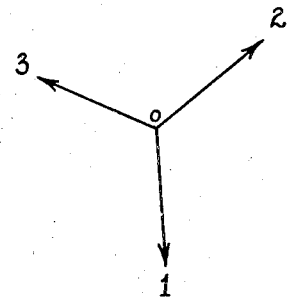

The drum when moved to its sixth lowering position engages segment 27 with its contact finger whereby the drum through that segment and segment 22 provides a direct connection between motor terminal and line $L^3$ as shown in Fig. 7. Thus the motor now has its terminals $T^1$, $T^2$ and $T^3$ connected directly to lines $L^3$, $L^2$ and $L^1$ respectively, and has all secondary resistance in circuit, such resistance being sufficient to protect the motor against an excessive speed under the influence of an overhauling load. Fig. 7a is a vector showing for this step of control and the speed torque characteristic will be substantially that depicted by curve 6 of Fig. 8.

It will be observed that throughout operation of the drum in lowering direction the motor is protected against loss of torque, just as pointed out in connection with the transition from the first step to the second step, and as will be apparent while this is shown as accomplished through use of resistance and potentiometer type connections therefor other forms of impedance may be employed with similar results.

Also it will be observed that the control through the medium of impedance alone which is herein disclosed may be accomplished by electromagnetic switches as well as by a drum or other mechanical type of controller.

What we claim as new and desire to secure by Letters Patent is:

1. A method of controlling the braking action of a polyphase motor under overhauling load conditions, which comprises subjecting throughout braking action not less than two terminals of the motor primary to full potential from two lines of a polyphase supply circuit, and through use of impedance in the motor primary connections effecting shift of the potential of one terminal of the motor primary from one of said two lines to a third line of said supply circuit.

2. A method of effecting under overhauling load conditions graduated braking by an alternating current motor through use of impedance alone which comprises the step of connecting the motor primary to its supply circuit with impedance included in certain of the connections, thereby to effect voltage unbalance of the motor primary and a given braking action characterized by a given motor braking torque at zero speed and which comprises the further step of varying relatively the impedance of said connection and that of another then existing connection of the motor primary thereby to effect through a different voltage unbalance of the motor primary a decreased braking action characterized by a reversed motor torque at zero speed.

3. In an alternating current motor braking system, the combination with an alternating current motor, of an alternating current supply circuit, and means to subject the primary of said motor to supply of power from said supply circuit and to effect voltage unbalance of the motor primary for a given braking action of said motor characterized by motor torque of given direction at zero speed, said means comprising impedance through the medium of which said means may effect change of the voltage unbalance of the motor primary for reduced braking action of said motor characterized by a reverse motor torque at zero speed.

4. In an alternating current motor braking system, the combination with an alternating current motor, of an alternating current supply circuit, and means to subject the primary of said motor to supply of power from said supply circuit and to effect voltage unbalance of the motor primary for a given braking action of said motor characterized by motor torque of given direction at zero speed, said means comprising impedance through the medium of which said means may effect change of the voltage unbalance of the motor primary for reduced braking action of said motor characterized by a reverse motor torque at zero speed and to effect such change in braking action of the motor without interruption of connections between the motor primary and said supply circuit.

5. In an alternating current motor braking system, the combination with an alternating current motor, of an alternating current supply circuit, a plurality of sections of impedance and means for establishing connection of the motor primary to said supply circuit inclusive of certain of said sections of impedance for voltage unbalance of the motor primary for given braking action of said motor characterized by motor torque of given direction at zero speed and for modifying said connection between the motor primary and said supply circuit solely through circuit control of certain of said impedances thereby to modify the voltage unbalance of the motor primary for reduced braking action of said motor characterized by reverse motor torque at zero speed.

6. In an alternating current motor braking system, the combination with an alternating current motor, of an alternating current supply circuit, a plurality of sections of impedance and means for establishing connection of the motor primary to said supply circuit inclusive of certain of said sections of impedance for voltage unbalance of the motor primary for a given braking action of said motor characterized by motor torque of given direction at zero speed and for modifying said connection between the motor primary and said supply circuit solely through circuit control of certain of said impedances thereby to modify the voltage unbalance of the motor primary for reduced braking action of said motor characterized by reverse motor torque at zero speed, said means maintaining power connections for the motor primary in so modifying the braking action of said motor.

7. In an alternating current motor braking system, the combination with a polyphase motor, of a polyphase supply circuit, impedance and means for connecting all terminals of the motor primary to lines of said supply circuit with a common connection for certain terminals of the motor primary and with a portion of said impedance in series with one of the latter terminals, thereby to provide for a given braking action of said motor characterized by motor torque of given direction at zero speed, thereafter including a portion of said impedance in series with the other of said latter motor terminals as a transition step and thereafter excluding the first mentioned portion of said impedance, for a reduced braking action of said motor characterized by a reverse motor torque at zero speed.

8. In an alternating current motor braking system, the combination with a polyphase motor, of a polyphase supply circuit, impedance and means for connecting all terminals of the motor primary to lines of said supply circuit with a common connection for certain terminals of the motor primary and with a portion of said impedance in series with one of the latter terminals, thereby to provide for a given braking action of said motor characterized by motor torque of given direction at zero speed, thereafter including a portion of said impedance in series with the other of said latter motor terminals as a transition step and thereafter excluding the first mentioned portion of said impedance, for a reduced braking action of said motor characterized by a reverse motor torque at zero speed, said means affording likewise without interruption of power supply to the motor transfer back to said connections for said given braking action.

9. In an alternating current motor braking system, the combination with a polyphase motor, of a polyphase supply circuit, impedance and means for connecting all terminals of the motor primary to lines of said supply circuit with a common connection for certain of said terminals and with a portion of said impedance in series with one of the latter terminals, thereby to provide for given braking action of said motor characterized by motor torque of given direction at zero speed, thereafter including a portion of said impedance in series with the other of said latter motor terminals as a transition step and thereafter excluding the first mentioned portion of said impedance, for a reduced braking action of said motor characterized by a reverse motor torque at zero speed, said means additionally affording further reduction in the braking action of said motor by increasing the amount of said impedance in the line connection of the last mentioned motor terminal.

10. In an alternating current motor braking system, the combination with a polyphase alternating current motor, of a polyphase supply circuit, impedance and means for connecting the motor primary to certain lines of said supply circuit with certain terminals of the motor primary connected to a common supply line and with a portion of said impedance in series with one of said terminals, for given braking action of said motor characterized by motor torque of given direction at zero speed, thereafter including a portion of said impedance in series with a second of said motor terminals and excluding the first mentioned portion of impedance, for reduced braking action characterized by reverse torque of the motor at zero speed, and thereafter connecting the last mentioned terminal through a portion of said impedance to a second line of said supply circuit for further reduction of the braking action of said motor.

11. In an alternating current motor braking system, the combination with a polyphase alternating current motor, of a polyphase supply circuit, impedance and means for connecting the motor primary to certain lines of said supply circuit with certain terminals of the motor primary connected to a common supply line and with a portion of said impedance in series with one of said terminals, for given braking action of said motor characterized by motor torque of given direction at zero speed, thereafter including a portion of said impedance in series with a second of said motor terminals and excluding the first mentioned portion of impedance, for reduced braking action characterized by reverse torque of the motor at zero speed, thereafter connecting said second terminal through a predetermined amount of said impedance to a second line of said supply circuit for further reduction of the braking action of said motor, and thereafter disconnecting said second motor terminal from said common line for further reduction in braking action of the motor.

12. A method of controlling the braking action of an alternating current hoist motor under overhauling load conditions which includes establishing voltage unbalancing power connections for the motor primary affording motor torque in hoisting direction at zero motor speed, and changing the impedance of certain of such power connections for a different voltage unbalance of the motor primary affording motor torque in lowering direction at zero motor speed.

13. A control system comprising an alternating current motor, three phase circuit means for energizing said motor, variable impedance means forming part of said circuit means and having an impedance range sufficient for energizing said motor by substantially single phase voltage and approximately balanced three phase voltage and selective control means under control by the operator and connected with said impedance means for progressively changing from said one to said other voltage and for affording progressively voltage unbalance characterized by torque of given direction at zero motor speed and voltage unbalance characterized by a reverse motor torque at zero motor speed.

JOHN F. H. DOUGLAS.
ERIC PELL.
EDWIN W. SEEGER.

REFERENCES CITED

The following references are of record in the file of this patent:

UNITED STATES PATENTS

| Number | Name | Date |
|---|---|---|
| 614,394 | Kahlenberg | Nov. 15, 1898 |
| 913,415 | Mershon | Feb. 23, 1909 |
| 2,228,078 | Gulliksen | Jan. 7, 1941 |